United States Patent
Varadan et al.

(10) Patent No.: US 11,360,863 B2
(45) Date of Patent: Jun. 14, 2022

(54) KEY-VALUE STORE ON PERSISTENT MEMORY

(71) Applicant: HEWLETT PACKARD ENTERPRISE DEVELOPMENT LP, Houston, TX (US)

(72) Inventors: Srikant Varadan, San Jose, CA (US); Tomasz Barszczak, San Jose, CA (US); Hao Luo, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 407 days.

(21) Appl. No.: 16/171,649

(22) Filed: Oct. 26, 2018

(65) Prior Publication Data
US 2020/0133800 A1   Apr. 30, 2020

(51) Int. Cl.
| | |
|---|---|
| G06F 11/14 | (2006.01) |
| G06F 11/20 | (2006.01) |
| H04L 67/1097 | (2022.01) |
| G06F 16/22 | (2019.01) |

(52) U.S. Cl.
CPC ...... *G06F 11/1471* (2013.01); *G06F 11/1438* (2013.01); *G06F 11/1464* (2013.01); *G06F 11/1469* (2013.01); *G06F 11/2064* (2013.01); *G06F 11/2069* (2013.01); *G06F 16/2246* (2019.01); *H04L 67/1097* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 9,075,710 B2 | 7/2015 | Talagala et al. | |
| 9,378,263 B2* | 6/2016 | Khimich | G06F 16/215 |
| 10,885,017 B2* | 1/2021 | Lyakas | G06F 16/2246 |
| 2012/0102298 A1 | 4/2012 | Sengupta et al. | |
| 2013/0339366 A1* | 12/2013 | Khimich | G06F 16/2228 707/741 |

(Continued)

OTHER PUBLICATIONS

DeBrabant et al. "Anti-caching: A new approach to database management system architecture," 2013, Proceedings of the VLDB Endowment, vol. 6, No. 14 (2013), pp. 1942-1953, <http://cs.brown.edu/courses/cs227/archives/2015/papers/mm2-anticaching.pdf>.

(Continued)

*Primary Examiner* — Kim T Nguyen
(74) *Attorney, Agent, or Firm* — Hewlett Packard Enterprise Patent Department

(57) ABSTRACT

A technique for reducing recovery time in a computing apparatus includes: storing data in a key-value store residing in a persistent memory, the key-value store including a plurality of persistent nodes including key-value pairs, the key-value pairs of the persistent nodes being unsorted; caching selected persistent nodes in a volatile memory, the key-value pairs of the cached nodes being sorted, the caching including instantiating a dual pointer for each cached node, the dual pointer including a volatile pointer to a child node of the cached node and a persistent pointer to the child node of the corresponding persistent node in the key-value store; and rebuilding the cache of selected nodes upon demand using the dual pointers in the event of recovery.

20 Claims, 8 Drawing Sheets

(56) References Cited

U.S. PATENT DOCUMENTS

| | | | | |
|---|---|---|---|---|
| 2017/0039231 | A1* | 2/2017 | Ishizaki | G06F 16/2246 |
| 2017/0242799 | A1* | 8/2017 | O'Krafka | G06F 12/0802 |
| 2017/0277709 | A1* | 9/2017 | Strauss | G06F 3/0631 |
| 2019/0108267 | A1* | 4/2019 | Lyakas | G06F 16/278 |
| 2020/0133800 | A1* | 4/2020 | Varadan | G06F 11/1464 |

OTHER PUBLICATIONS

DeBrabant et al., "A prolegomenon on OLTP database systems for non-volatile memory," 2014, ADMS@ VLDB (2014), Proceedings of the VLDB Endowment, vol. 7, No. 14, <http://www.adms-conf.org/2014/adms14_debrabant.pdf>, 7 pages.

Eldawy et al., "Trekking through Siberia: Managing cold data in a memory-optimized database," 2014, Proceedings of the VLDB Endowment vol. 7, No. 11 (2014), pp. 931-942, <https://cs.brown.edu/courses/cs227/archives/2015/papers/mm2-siberia.pdf>.

Stolarczuk et al., "GitHub—pmem/pmemkv at v.01x", available online at <https://github.com/pmem/pmemkv/tree/v0.1x>, Aug. 31, 2017, 6 pages.

Andrew Kryczka et al., "RocksDB Basics," available online at <https://github.com/facebook/rocksdb/wiki/RocksDB-Basics/8e2e3fb9e163fbc370b13c3d2baf8ecf798f85e5>, Dec. 19, 2017, 12 pages.

Andy Rodoff, "Persistent Memory Programming," available online at <https://web.archive.org/web/20180630222041/https://www.usenix.org/system/files/login/articles/login_summer17_07_rudoff.pdf>.;login:, Summer 2017, vol. 42, No. 2, Jun. 30, 2018, pp. 34-40.

Chen et al., "Persistent b+-trees in non-volatile main memory", Proceedings of the VLDB Endowment, vol. 8(7), 2015, pp. 786-797.

Chen et al., "Rethinking Database Algorithms for Phase Change Memory", 5th Biennial Conference on Innovative Data Systems Research, Jan. 9-12, 2011, pp. 21-31.

Dong, et al. "Welcome to RocksDB," available online at <https://github.com/facebook/rocksdb/wiki/Home/b6dea4ac820cf4eca18a56dd2387b57fce010184>, Jul. 26, 2018, 5 pages.

Facebook Database Engineering Team, "RocksDB: A Persistent Key-Value Store for Flash and RAM Storage," available online at <https://web.archive.org/web/20180528134808/https://github.com/facebook/rocksdb>, May 28, 2018, 3 pages.

Hideaki Kimura, "FOEDUS: OLTP Engine for a Thousand Cores and NVRAM", Proceedings of the 2015 ACM SIGMOD International Conference on Management of Data, May 31, 2015, pp. 691-706.

Oracle, "Managing Indexes," Oracle® Database Administrator's Guide, available online at <https://web.archive.org/web/20170718171228/https://docs.oracle.com/database/121/ADMIN/indexes.htm>, 12c Release 1 (12.1), Ch. 21, Jul. 18, 2017, 29 pages.

Oukid et al., "FPTree: A Hybrid SCM-DRAM Persistent and Concurrent B-Tree for Storage Class Memory", Proceedings of the 2016 International Conference on Management of Data, Jun. 26, 2016, 16 pages.

pmem.io Persistent Memory Programming, "Persistent Memory Development Kit," available online at <https://web.archive.org/web/20180603023517/http://pmem.io/pmdk>, Jun. 3, 2018, 3 pages.

Rob Dickinson, "pmemkv: Key/Value Datastore for persistent memory", available online at <https://github.com/xuning97/pmemkv-for-pmem/blob/master/README.md>, Jun. 6, 2018, 5 pages.

Yang et al., "NV-Tree: Reducing Consistency Cost for NVM-based Single Level Systems", Proceedings of the 13th USENIX Conference on File and Storage Technologies, Feb. 16-19, 2015, pp. 167-181.

Marmol, L. et al., "NVMKV: A Scalable and Lightweight Flash Aware Key-Value Store" (Research Paper), HotStorage, May 9, 2014, 5 pages, https://www.usenix.org/system/files/conference/hotstorage14/hotstorage14-paper-marmol.pdf.

Ren, J. et al.,"ThyNVM: Enabling Software-Transparent Crash Consistency in Persistent Memory Systems," (Research Paper), MICRO-48, Dec. 5-9, 2015, pp. 672-685, https://www.microsoft.com/en-us/research/wp-content/uploads/2016/04/ren_thynvm_micro15.pdf.

Zhang, Y. et al., "Mojim: A Reliable and Highly-Available Non-Volatile Memory System," (Research Paper), ACM SIGARCH Computer Architecture News, vol. 43. No. 1. ACM, Mar. 14-18, 2015, pp. 3-18, http://cseweb.ucsd.edu/~yiyingzhang/mojim-asplos15.pdf.

Debnath, B. et al., "FlashStore: High Throughput Persistent Key-Value Store," (Research Paper), Proceedings of the VLDB Endowment 3.1-2, Sep. 13-17, 2010, pp. 1414-1425, http://vldbarc.org/pvldb/vldb2010/pvldb_vol3/l04.pdf.

* cited by examiner

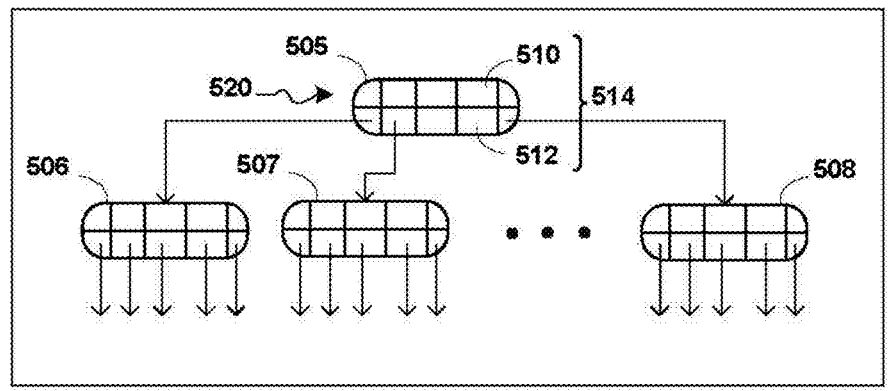

Figure 5

600 — 605
STORE DATA IN A KEY-VALUE STORE RESIDING IN A PERSISTENT MEMORY, THE KEY-VALUE STORE INCLUDING A PLURALITY OF PERSISTENT NODES INCLUDING KEY-VALUE PAIRS, THE KEY-VALUE PAIRS OF THE PERSISTENT NODES BEING UNSORTED

610
CACHE SELECTED PERSISTENT NODES IN A VOLATILE MEMORY, THE KEY-VALUE PAIRS OF THE CACHED NODES BEING SORTED, THE CACHING INCLUDING INSTANTIATING A DUAL POINTER FOR EACH CACHED NODE, THE DUAL POINTER INCLUDING A VOLATILE POINTER TO A CHILD NODE OF THE CACHED NODE AND A PERSISTENT POINTER TO THE CHILD NODE OF THE CORRESPONDING PERSISTENT NODE IN THE KEY-VALUE STORE

620
REBUILD THE CACHE OF SELECTED NODES UPON DEMAND USING THE DUAL POINTERS IN THE EVENT OF RECOVERY

KEY-VALUE STORE ON PERSISTENT MEMORY

BACKGROUND

Many computing machines are designed to minimize the adverse impacts of system or component failure. One concern in this respect is "recovery", in which the computing apparatus attempts to recover its operating state after some kind of failure and resume operation. The recovery process reads any data that survives process restart and rebuilds its runtime state. Process restart may be simple a process stop/start, operating system ("OS") reboot, or even a "failover" in which the process restarts on a different component than where it was running previously. It is also desirable that the techniques employed in recovery do not adversely impact the normal operations of the apparatus.

BRIEF DESCRIPTION OF THE DRAWINGS

Examples described herein may be understood by reference to the following description taken in conjunction with the accompanying drawings, in which like reference numerals identify like elements.

FIG. 5 illustrates an example of the key-value store of FIG. 1 in a simplified version.

FIG. 6 illustrates one particular example of a method such as can be practiced using the architecture of FIG. 1.

While examples described herein are susceptible to various modifications and alternative forms, the drawings illustrate specific examples herein described in detail by way of example. It should be understood, however, that the description herein of specific examples is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative examples of the subject matter claimed below will now be disclosed. In the interest of clarity, not all features of an actual implementation are described in this specification. It will be appreciated that in the development of any such actual example, numerous implementation-specific decisions will be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
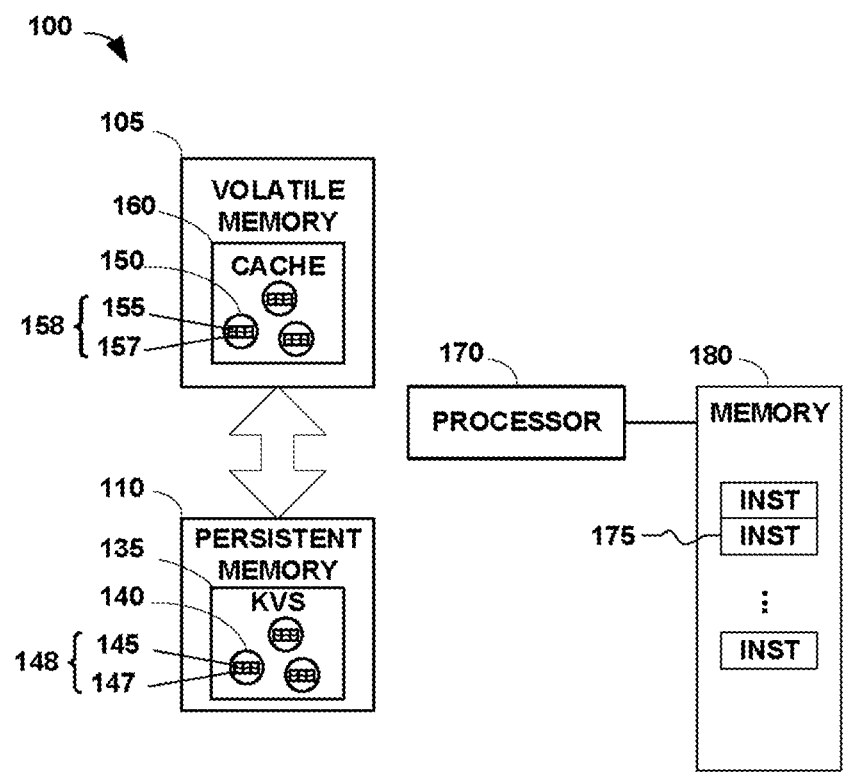
FIG. 1 depicts selected aspects of the hardware and software architecture of one particular example of the subject matter claimed below.

FIG. 1 illustrates selected aspects of the hardware and software architecture 100 of one particular example of the subject matter claimed below. The architecture 100 includes a volatile memory 105 comprised of dynamic random access memory ("DRAM"). It is referred to as "volatile" because it does not retain its content when it loses power. The architecture 100 also includes a persistent memory 110 comprised of, in this particular example, non-volatile dual inline memory modules ("NVDIMMs") that are not separately shown. It is called "persistent", or sometimes "non-volatile", because it does retain its content when power is lost.

In some examples or conventional practice, shadow copies, or full copies, of the data and/or metadata stored in the persistent memory 110 are kept in the volatile memory 105, for example, in the form of associative maps (not shown) that utilize sorted ordering to reference the data and metadata. Thus, in the event of recovery, the persistent memory 110 may be scanned to rebuild the data structures of the shadow copies in the volatile memory 105. Accordingly, in such examples, a larger persistent memory may increase recovery time because it may take longer to scan and rebuild the shadow copies in the volatile memory. Such examples suggest that a smaller persistent memory may be beneficial for recovery purposes. However, a smaller persistent memory may slow other aspects of performance. A larger persistent memory can, for example, sometimes increase the speed of write operations, so a smaller persistent memory may lose this benefit to the speed of write operations.

Examples disclosed herein may mitigate this tradeoff between recovery time and performance by managing the content of the persistent memory 110, functioning as an update buffer, as a persistent key-value store that involves reduced processing to recover into volatile memory 105. Examples disclosed herein may include using the volatile memory 105 as a write-through cache to the persistent memory 110 instead of using it to maintain a shadow copy of the content of persistent memory 110. Examples disclosed herein include using dual pointers 200, shown in FIG. 2. Each dual pointer 200 comprises both a volatile pointer 210 and a persistent pointer 220 implemented as described more fully below. The dual pointers 200 are then used in recovery, also as discussed further below.

More particularly, the persistent memory 110 includes a key-value store 135 comprised of a plurality of persistent nodes 140, only one of which is indicated by a reference number in FIG. 1. Each persistent node 140 comprises a plurality of keys 145, each key having an associated value 147. The persistent nodes 140 are, in this particular example, structured in a tree as will be discussed further below. The associated value 147 is a persistent pointer if the persistent node 140 is an internal node of the tree and an actual value inserted in the key-value store 135 if the persistent node 140 is a leaf node.

The keys 145 and their associated values 147 may be referred to as "key-value pairs" 148. The keys 145 are unsorted in key-value store 135, meaning that they are not maintained in any particular order. Since the keys 145 are unsorted, the key-value pairs 148 are also unsorted. Note that the associated value 147 in each key-value pair 148 is a persistent pointer 220, shown in FIG. 4, whose function will be described further below.

The volatile memory 105 includes a cache 160. In general, when a persistent node 140 is accessed, it is "cached", or stored temporarily, in the cache 160 as a cached node 150. Only one cached node 150 is indicated by a reference number in FIG. 1. Each cached node 150 is a partial copy of its corresponding persistent node 140, each cached node 150 including key-value pair(s) 158 that are partial copies of the key value pair(s) 148 of the corresponding persistent node 140. Each key-value pair 158 includes a key 155 that is a copy of a key 145 of the corresponding persistent node 140 and an associated value 157 that is a partial copy of the associated value 147 of the corresponding persistent node 140.

The cached nodes 150, in this particular example, are also structured in a tree as will also be discussed further below. If the cached node 150 is an internal node in the tree, the associated values 157 of the key value pairs 158 are dual pointers 200, illustrated in FIG. 2 and discussed further below. Each dual pointer 200 incudes a persistent pointer 220 and a volatile pointer 210. If the cached node 150 is a leaf node of the tree, then the associated values 157 may be the values stored in the key-value store 135 in the corresponding persistent node 140.

In the phrase "key-value pair", a "value" may be, for example, data received for storage in the key-value store (e.g., from a component, program, process, etc., that is outside of or otherwise separate from the key-value store), or a pointer to a child node in the key-value store. For example, the value of a child node may be data received for storage in the key-value store, while, for an internal node, the value may be a pointer to a child node. In the context of this disclosure, "outside" means It means a value that is stored in the key value store from the point of view of the user of the key value store. "User" here means not a person, but whatever other piece of code is using the key value store to store values for given keys.

Each cached node 150 is therefore a partial copy of its corresponding persistent node 140 because it contains key-value pairs 158 that are partial copies of the key-value pairs 148 of its corresponding persistent node 140, the key-value pairs 158 containing the same keys 155 as keys 145 of the corresponding persistent node 140 and containing values 157 similar to the values 147 of the corresponding persistent node 140 (e.g., the values 157 having the same persistent pointers 220 as the values 147, but also include the volatile pointers 210). As used herein, a "partial copy" of a node or key value pair does not necessarily include less than all of the data of the original node or key value pair, but may include some or all of the data of the original, but with some differences in representation, arrangement, or the like (e.g., maybe sorted rather than unsorted), and may in some examples include more or different data than the original node or key value pair (e.g., including a volatile pointer in addition to a nonvolatile pointer of the original).

While the cached nodes 150 contain partial copies of the persistent nodes 140, the cached nodes 150 also differ from their corresponding persistent nodes 140 in that the keys 155 of each cached node 150, and thus their key-value pairs 158, are sorted, unlike the keys 145 and key-value pairs 148 of persistent nodes 140, as described above. When a cached node 150 is created, the keys 155 are sorted, or ordered. Note that this also sorts the key-value pairs 158. They may be sorted or ordered in any suitable manner known to the art. For example, they may be sorted in ascending order of the numerical value of the keys 155 for reasons that will later become apparent.

The functionality of the architecture 100 relative to the volatile memory 105 and the persistent memory 110 may be implemented by at least one processor 170 executing instructions 175 located in a memory 180. The processor 170 may be any suitable kind of processor known to the art, such as a central processing unit ("CPU"), or a processor in a processor set, or the like. The processor 170, upon execution of the instructions 175, may perform the functions described herein regarding the creation and maintenance of the cache 160 in the volatile memory 105 as well as the key-value store 135 in the persistent memory 110 and their use in recovery as will now be discussed.

Figure 4:
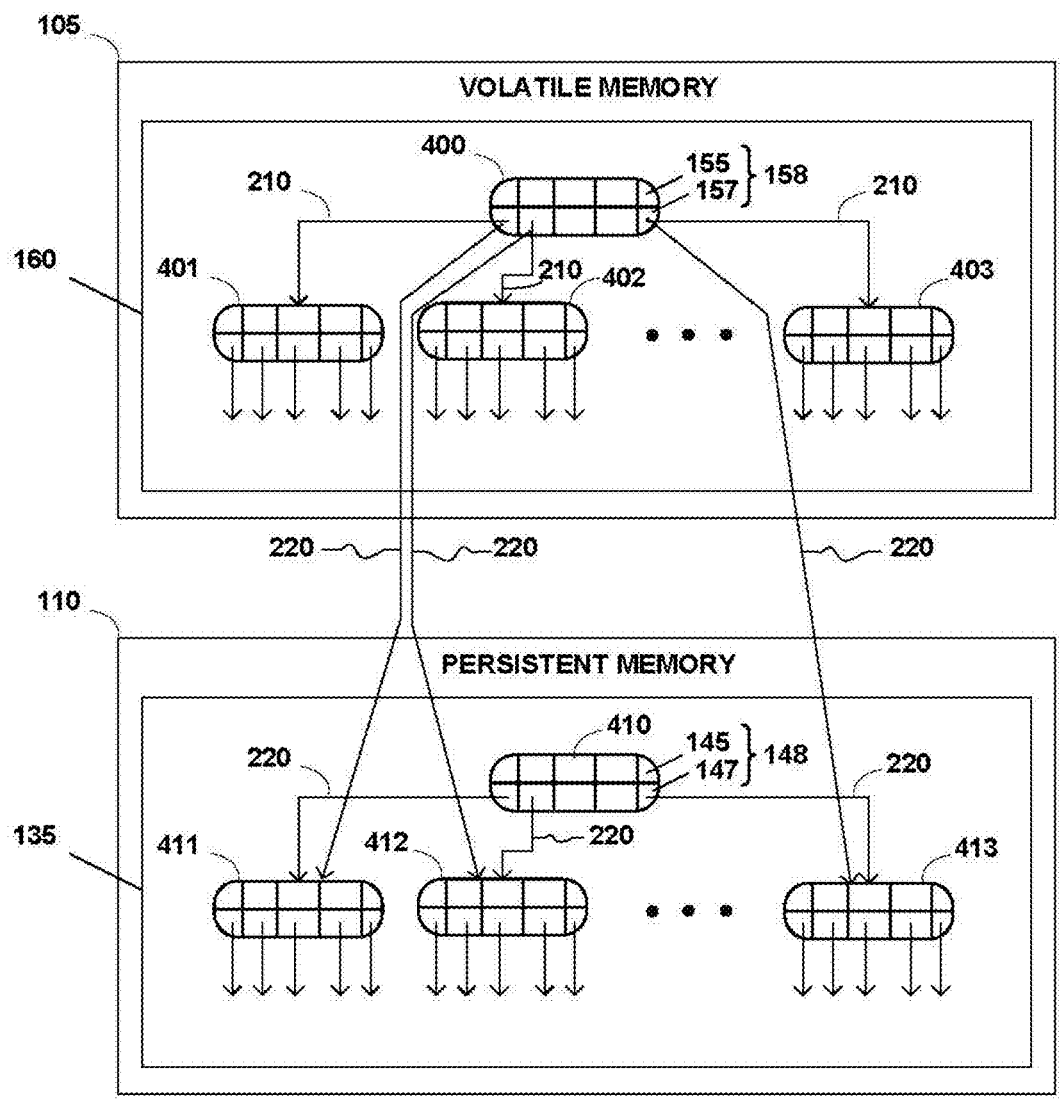
FIG. 4 shows the operation of the dual pointer in accordance with one or more examples.

Turning now to FIG. 4, this example of the volatile memory 105 includes cached nodes 400-403, which have the same features as cached nodes 150, described above. The example illustrated in FIG. 4 also includes an example of the persistent memory 110 that includes persistent nodes 410-413, which have the same features as persistent nodes 140, described above. In the example of FIG. 4, each cached node 400-403 includes a dual pointer such as the dual pointer 200 shown in FIG. 2. For each cached node 400-403, the key-value pairs 158 each include a volatile pointer 210 that points to a child node of the cached nodes 400-403, and a persistent pointer 220 that points to a child persistent node of the corresponding persistent node 410-413 in persistent memory 110.

For example, for one key-value pair 158 of cached node 400, the volatile pointer 210 points to child cached node 401 in volatile memory 105 and the persistent pointer 220 points to a child persistent node 413 that is a child node of the persistent node 410 (in persistent memory 110) corresponding to cached node 400. While some example pointers are shown for cached node 400, the same types of pointers may be contained in additional key-value pairs 158 in key-value pairs of nodes 401-403 (and any other cached nodes in volatile memory 105). For each of persistent nodes 410-413, etc. of persistent memory 110, the respective values 147 of each key-value pair 148 include respective persistent pointers 220 that point to the child persistent nodes in persistent memory 110 and do not include volatile pointers to nodes in volatile memory 105.

In some examples, key-value store 135 of FIG. 1 may be implemented by a B+ tree. FIG. 5 depicts a simplified B+ tree key-value store 500 (which may be used to implement key-value store 135 in some examples). Tree structures are a form of data structure which, in the present context, are used to locate sought-after data stored in storage of a computing system—for example, the backend storage 710 in FIG. 7 discussed below. The data might be sought as a part of a write operation in which a process is attempting to write the data to storage. Or, the data might be sought as a part of a read operation where a process is attempting to read the data from the storage. In some examples, the storage may be different than the persistent memory and the volatile memory described above.

The B+ tree of key-value store 500 comprises a plurality of linked nodes, each node comprising a data structure comprising a key and one or more values. One of the nodes is the "root node", or the first node in the tree (e.g., a node with no parent node and which is directly or indirectly a parent node of all other nodes in the tree). Each of the other nodes is an internal node or a leaf node. The value of each internal node is a pointer to another location. For each of the internal nodes, the values are pointers to other nodes in the tree or some other location. As disclosed herein, the pointers of internal nodes that are cached nodes may be dual pointers such as is discussed above. Note that by definition no node's pointer(s) may point to the root node. If the pointers of a node point to other nodes, then the node is an "internal node" in examples described herein. In leaf nodes, the nodes may store a value form outside instead of a pointer or, perhaps, a pointer to a location in storage where such a value may be stored. If the node stores an outside value instead of having a pointer, or the pointer(s) of a node point to locations in storage, then the node is a "leaf node" in examples described herein.

So, in FIG. 5, the node 505 is the root node because it is the first node in the B+ tree 500. Since the root node 505 is linked by pointers to other nodes—namely, at least the nodes 506-508, it is also considered to be an internal node. (Note that if the pointers are dual pointers, one of the dual pointers will point to a corresponding node in the tree of the persistent memory as described above relative to FIG. 4.) FIG. 5 does not show the locations to which the pointers of the nodes 506-508 point. If those locations are other nodes, then the nodes 506-508 also are internal nodes. If those locations are in storage (i.e., not other nodes in tree 500), then they are leaf nodes. (Note also that if the nodes 506-508 are leaf nodes they may not have pointers, but rather store an outside value as described above.) For present purposes, the key-value store 500 is shown having only four nodes 505-508. Those in the art having the benefit of this disclosure will appreciate that the key-value store 500 may be much larger and more complicated in any given practical implementation although the structure will be similar.

The particular key-value store 500 is a B+ tree. B+ trees are common and well known in the art. One characteristic of B+ trees is the way their structure is tied to the physical memory into which they are used to index the sought-after data. The keys 510 are unique relative to one another and permit access to the associated values 512. In this context, the keys 510 are representations of the location of the sought-after data in the memory, and reflect the structure of the B+ tree between respective node 505-508 and the actual location. The associated values 512 are pointers to the next step on the pathway between the respective node 505-508 and the actual location or are stored values. If the respective node 505-508 is an internal node—for example, the root node 505—the pointer will be to another node in the next level of the B+ tree 500—e.g., one of the nodes 506-508. (Again, if the pointer is a dual pointer, then one of the pointers will point to a corresponding node in the tree in persistent memory as discussed relative to FIG. 4.) If the respective node 505-508 is a leaf node, the associated value will be a stored value from outside or a pointer to the location of the sought-after data.

So each node 505-508 therefore includes a plurality of keys 510 and a plurality of values 512 in key-value pairs 514, each value 512 being associated with a key 510 (although for simplicity of illustration only one key 510 and one value 512 are indicated by reference numerals in FIG. 5). In the internal node 505, each value 512 is a pointer to another node as will be the case for the nodes 506-508 if they are internal nodes. If the nodes 506-508 are leaf nodes, then each value 512 is a pointer to a location where the actual data is kept or each value 512 may be an actual stored value from outside.

The key-value pairs 514 are unsorted. In each node 505-508, the key-value pairs 514 of that node are stored in an array 520 of that node. For this reason, when an insertion is made to the tree 500, it is performed relatively quickly because there is no need to order, or "re-order", the key-value pairs 514 within the nodes 505-508. This has a ripple effect all the way back up the tree 500 since none of the key-value pairs 514 in any of the nodes 505-508 need to be re-ordered.

Referring now to both FIG. 1 and FIG. 6, FIG. 6 illustrates one particular example of a method such as can be practiced using the architecture of FIG. 1 in some examples. The process 600 begins with storing (at 605) data in a key-value store 135 residing in a persistent memory 110, the key-value store 135 including a plurality of persistent nodes 140 including key-value pairs 148, the key-value pairs 148 of the persistent nodes 140 being unsorted as described above. The key-value store 135 may be any of a number of suitable key-value stores known to the art. In one particular implementation discussed herein, the key-value store is a B+ tree data structure.

Referring again to FIG. 6, the process 600 then continues (at 610) by caching selected persistent nodes 140 in a volatile memory 105, the key-value pairs of the cached nodes 150 being sorted. In the computing arts, a "cache" is a memory store that contains temporary copies of data stored elsewhere so that future requests for data can be served more quickly from the temporary copies than they otherwise would be. To store that data in the cache is to "cache" the data. Thus, the process 600 (at 610) makes a copy of the information in a persistent node 140 and creates a cached node 150 in the volatile memory 105 containing the same information (though potentially with a different representation, for example). As discussed above, the cached nodes 150 differ from the corresponding persistent nodes 140 in that they include dual pointers 200, show in FIG. 2, for their associated values of their key-value pairs rather than just a persistent pointer 220, shown in FIG. 4, and the key-value pairs of cached nodes 150 are sorted.

More particularly, in examples described herein, caching a cached node 150 from a persistent node 140 includes creating, and storing in the volatile memory 105, a new cached node 150 that includes the same keys and associated values as the persistent node 140 from which it is cached, with the key-value pairs 158 being sorted in the cached node 150. Cached nodes 150 stored in volatile memory 105 may be referred to herein as "cached" nodes because they have been "cached" from the persistent nodes 140. However, unlike the key-value pairs 148 of the persistent node 140, the key-value pairs 158 of the cached nodes 150 are sorted, as described herein.

In examples described herein, each cached node 150 in volatile memory 105 may be said to correspond to the respective persistent node 140 in the persistent memory 140 from which it was cached. Because cached nodes 150 are cached from persistent nodes 140, each cached node 150 may have a corresponding persistent node 140 in persistent memory 110. The key-value pairs 158 of the cached nodes 150 may be derived from the key-value pairs 148 of the persistent nodes 140 in persistent memory 110, as described above. However, fewer than all of the persistent nodes 140 in the key-value store 135 of persistent memory 110 may have a corresponding cached node 150 in volatile memory 105.

The cache 160 may be a key-value store in some examples. Where it is a key-value store, it may be of the same kind of key-value store as the key-value store 135 in the persistent memory 110. In some examples, the cache 160 may be a different kind of key-value store than is implemented in the key-value store 135. In some examples, the cache 160 may not be a key-value store.

The presently disclosed techniques admit wide variation in the manner of selecting which persistent nodes 140 are cached in the volatile memory 105 as cached nodes 150. In the implementation mentioned above, in which the key-value store 135 is a B+ tree, the persistent nodes 140 selected to be cached as cached nodes 150 may include any internal tree nodes accessed on a path from the tree root to an accessed key since a last recovery of architecture 100. In this context, a node may be "accessed" when adding a key-value pair to a node, when reading key-value pair from a node, when modifying a value in key-value pair of a node, when deleting a key-value pair of a node, or the like.

Other examples may select the persistent nodes 140 for caching differently. For example, fewer internal nodes of the key-value store 135 could be cached in the volatile memory 105 (e.g., when volatile memory 105 is small). Alternatively, higher level nodes might be cached in volatile memory 105 while excluding the lowest level of internal nodes. Or a subset of the lowest level internal nodes might be cached. On the other hand, some implementations might try to cache more persistent nodes 140 in volatile memory 105. For instance, one example might cache all leaf nodes, or a subset of leaf nodes. The manner of selection will therefore be implementation specific.

The sorted key-value pairs 158 of the cached nodes 150 are inefficient for insertions. This is because an insertion changes the structure of the tree in the key-value store 135 and, since the key-value pairs 158 and their ordering reflect the structure of the tree, a change to the tree structure changes the ordering of the sorted keys. On average, half the number of keys are moved within the node when there is an insertion. Still further, the changes are rippled back up the tree to any nodes between the inserted node and the root node up to and including the root node. This also involves frequent expensive and inefficient use of store barriers such as execution pipeline stalls to ensure consistency on recovery.

But sorted key-value pairs are relatively efficient for lookups in the tree, since a lookup process may utilize the sorted ordering of the keys to more efficiently find a sought after key than in a case where the keys are unsorted. If the key-value pairs are unsorted, as in the persistent memory, then an expensive linear search through the array of key-value pairs is conducted to find the desired key-value pair. While sorted key-value pairs are relatively quicker for lookup, they are relatively slower for insertions (i.e., because of the need to re-order the keys in the nodes above the inserted node, as described above). However, while unsorted key-value pairs are slow for lookups (i.e., due to use of linear search), they are relatively quick for insertions because there is no need for re-ordering (as described above).

Figure 2:
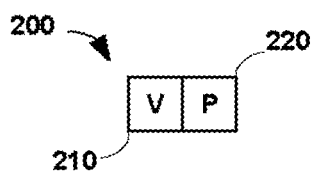
FIG. 2 illustrates one example of a dual pointer in the example of FIG. 1.
Figure 3:
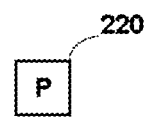
FIG. 3 illustrates one example of a persistent pointer in the example of FIG. 1.

The dual pointer 200, shown in FIG. 2, takes advantage of the duality of the persistent and cached nodes 140, 150 and the fact that the key-value pairs 148 are unsorted in the cached nodes 140 while the key-value pairs 158 in the cached nodes 150 are sorted. A dual pointer 200 maintains pointers to both copies of a given child node, that is, both the persistent node 140 version and the cached node 150 version, thereby enabling use of the desired attribute (i.e., sorted or unsorted) depending on context. For example, examples described herein (e.g., instructions 175) may use the sorted key-value pairs 158 of the cached nodes 150 for lookups (to thereby take advantage of the efficiency of using sorted keys 155 for that purpose), while using the unsorted key-value pairs 148 of the persistent nodes 140 for insertions (to thereby take advantage of the efficiency of using the unsorted keys 145 for that purpose).

Above it is mentioned that sorted keys are inefficient for insertion. This inefficiency is much higher in persistent memory than in volatile memory. The use of store barriers mentioned as described above refers to this. Insertions to sorted key-values in cached nodes in volatile memory are much less expensive (although still more costly than if they were unsorted). When insert a key-value pair, it is inserted it in unsorted node in persistent memory (avoiding the cost) and in sorted node in cache in volatile memory (incurring some cost, but a much smaller cost than in persistent memory).

Returning to FIG. 6, caching (at 610) in the process 600 includes instantiating a dual pointer 200 for each cached node 150, the dual pointer 200 including a volatile pointer 210 to a child node of the cached node 150 in volatile memory 105 and a persistent pointer 220 to the child node of the corresponding persistent node 140 in the key-value store 135 of persistent memory 110. For each dual pointer 200, both the respective volatile pointer 210 and persistent pointer 220 reside in the volatile memory 105. Thus, when a lookup is performed, the sorted keys 155 of the cached nodes 150 may be used in conjunction with the volatile pointers 210 (e.g., to access a desired key-value pair). When an insertion is performed, the unsorted keys 145 of the persistent nodes 140 may be used in conjunction with the persistent pointers 220.

The process 600 then continues, in the event of performing a recovery process, by rebuilding (at 620) the cache 160 of selected nodes upon demand using the dual pointers 200. In examples described herein, "recovery" may refer to the mechanism(s) by which a computing system attempts to provide fault tolerance and attempts to prevent corruption due to failures therein. When a process (i.e., other than process 600) is interrupted, the process may restart and may subsequently read any data that survives the process restart, and then rebuild its runtime state by discovering the persistent memory and its data structures and either undoing or completing operations of the process that were interrupted by the failure in a manner known to the art. However, recovery may apply not only to a process, but also for any other code form. Other examples include, but are not limited to, kernel boot-up, if the code runs in kernel, as opposed to user-space process. The present technique is not limited to a user-space process restart.

The cache rebuild (at 620) in this example is "upon demand". For example, the cache 160 and its contents may be rebuilt on an "as needed" basis. The processor 170 therefore does not attempt to rebuild the cache 160 all at once as a part of a recovery process. Instead, in some examples, operations may resume after restart and, as accesses are made, the processor 170 performs them as usual—e.g., looking to the cache 160 first and, if the information is not found, looking to the key-value store 135. The cache 160 will begin empty when recovery starts, but over time cached nodes 150 will be created as described above and the cache 160 populated. Because there are no shadow copies, there is no need to scan the persistent memory and rebuild the shadow copies in volatile memory, thereby speeding up the recovery process.

Figure 7:
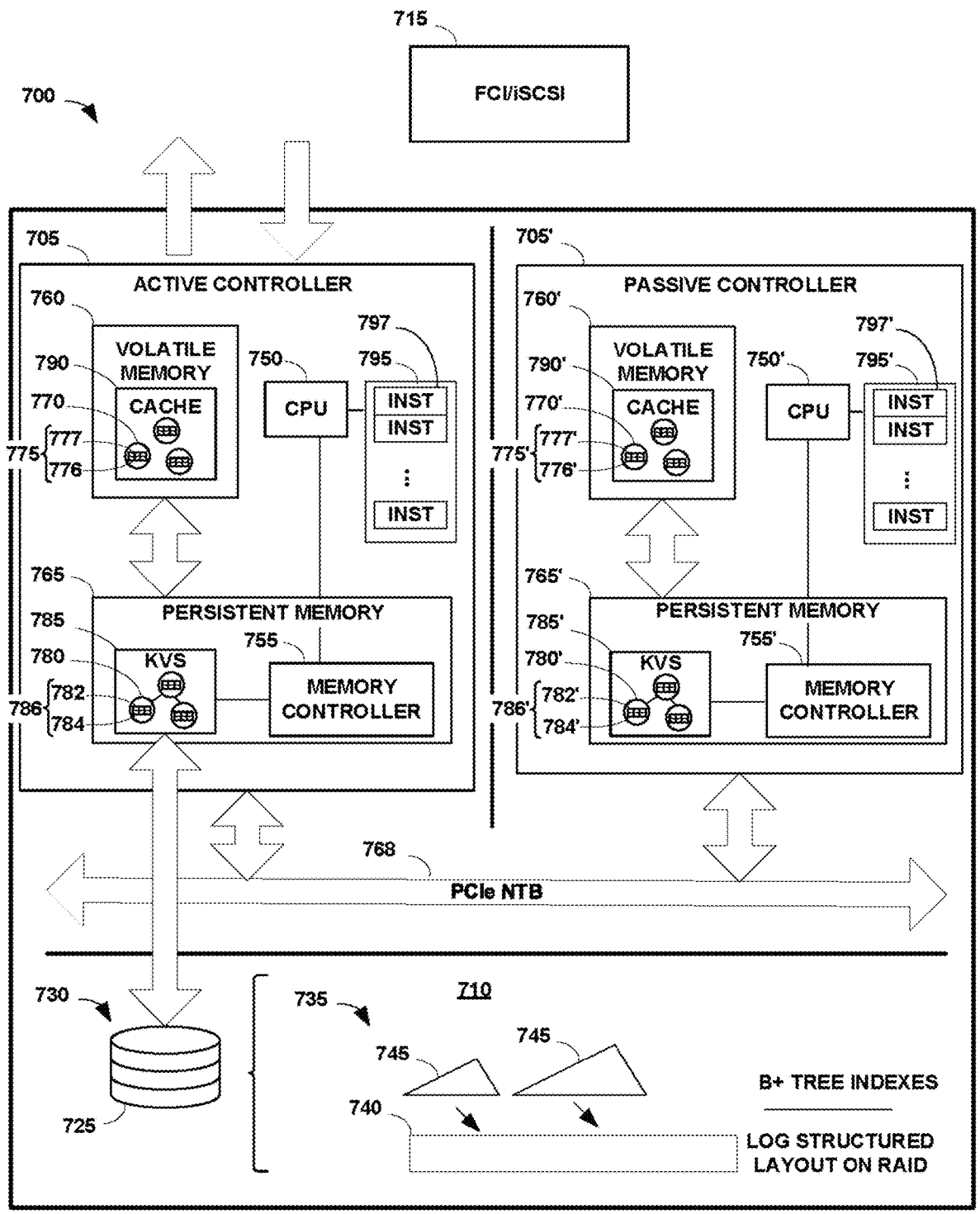
FIG. 7 depicts selected aspects of the hardware and software architecture of one particular example in which the architecture of FIG. 1 is deployed in a particular device.

A more particular example will now be disclosed to provide a fuller understanding of the subject matter claimed below. FIG. 7 illustrates selected aspects of the hardware and software architecture of an example storage system (e.g., a storage array) 700 employing a dual controller architecture. The subject matter claimed below is not limited to storage systems such as the storage system 700. Indeed, the subject matter claimed below is not even limited to use with storage systems. It may be used on, without limitation, desktop or laptop computers, and even mobile devices such as mobile phones and tablets. Consequently, although this particular example is implemented in a storage system, the examples described herein are not so limited and can be deployed to almost any computing apparatus.

Similarly, although this example uses a dual controller architecture, other examples may have a different number of controller(s). The present technique may be deployed on a computing apparatus regardless of whether it uses one, two, or more controllers. Some examples may not even have controllers such as the ones shown in FIG. 7, and may instead rely on processors as described above that are not a part of any kind of controller.

The storage system 700 includes an active controller 705 and backend storage 710. The active controller 705 receives requests for data stored in the backend storage 705 and transmits data responsive to those requests over a fabric 715. The fabric 715 may be, for example, a network or some other kind of computing system. A part of the fabric may be other devices or apparatuses (not shown) using data or other information in the backend storage 710 who transmit the requests and then use the data that is returned responsive to those requests.

The backend storage 710 also includes a passive controller 705'. Operations by the active controller 705 are mirrored to the passive controller 705' as described below. This includes all operations of the active controller 705, not just memory operations. In the event of failure by the active controller 705, the functionality is transferred to the passive controller 705', which then becomes the active controller for operations of the storage system 700. This is an example of "failover" mentioned above.

The backend storage 710 may more particularly comprise, in this particular example, one or more storage devices 725 (only one indicated in FIG. 7) that may be solid state drive(s), hard disk drive(s), or any other type of storage device, or a combination thereof. In one particular example, the backend storage 710 employs flash technology and is what is known to the art as a "flash array" in a redundant array of independent disks ("RAID") 730. The backend storage 710 retains its content when power is lost.

Data may be stored on the backend storage 710 using any suitable technique known to the art. In the illustrated example, the data is stored in a data structure 735 comprising a log-structured layout 740 accessed through B+ tree indexes 745. However, any suitable data structure known to the art may be used. The present techniques may be used regardless of the manner in which data is stored in the backend storage 710.

Still referring to FIG. 7, the fabric 715 may be implemented using any protocols known to the art. For example, the fabric 715 may use an Internet Protocol ("IP")-based standard such as Internet Small Computer System Interface ("iSCSI") or Small Computer System Interface ("SCSI"). Or, the fabric 715 may employ some alternative such as a serial data transfer architecture like the Fibre Channel standard Fibre Channel Arbitrated Loop ("FC-AL"). Still other alternatives are available and any suitable protocol or standard known to the art may be used.

The active controller 705 in this example comprises a central processing unit ("CPU") 750, a memory controller 755, a volatile memory 760, and a persistent memory 765. The memory controller 755 is a part of the persistent memory 765 in this example. The CPU 750 in this example may be a single-core CPU, a multi-core CPU, or any other suitable type of processor or processors. The CPU 750 interfaces with the fabric 715 to receive and transmit data to and from the storage system 700. The CPU 750 handles memory transactions through the memory controller 755. The memory controller 755 may be a part of the persistent memory 765 or separate therefrom. The volatile memory 760 may comprise dynamic random access memory ("DRAM") and the persistent memory 765 may comprise a plurality of non-volatile dual inline memory modules ("NVDIMMs"), for example, both as described above.

The operations of the active controller 705 are mirrored to the passive controller 705' (e.g., over a Peripheral Component Interconnect Express ("PCIe") non-transparent bridge ("NTB") 768). These operations include all operations of the controller with respect to the key-value store 785 and cache 790. The passive controller 705' has a similar architecture to the active controller 705 with like parts bearing like numbers but with an additional apostrophe to distinguish from the versions in the active controller 705 (i.e., volatile memory 760' is a volatile memory as described above in relation to volatile memory 760, etc.). In the event of failover, the passive controller 705' will assume control of operations from the active controller 705. This entails going through the recovery process described herein to maintain the availability of the storage system 700 to the fabric 715.

Still referring to FIG. 7, the CPU 750 in this particular example employs an Intel x86 architecture. Other examples may use processor architectures other than the Intel x86 architecture. The x86 architecture will be discussed relative to the illustrated example in order to provide a fuller understanding of the claimed subject matter.

The CPU cache hierarchy and memory ordering (not shown in FIG. 7) on Intel x86 architectures should be managed to account for durability, consistency, performance, fast recovery, and reliability. With respect to durability, memory writes should cross the persistence boundary prior to exposing the side effects of each B+ tree operation. That is, CPU 750 issues a write to some particular address, that write is not considered "persistent" until the write passes over to the memory controller 755 from the CPU 750.

Figure 15:
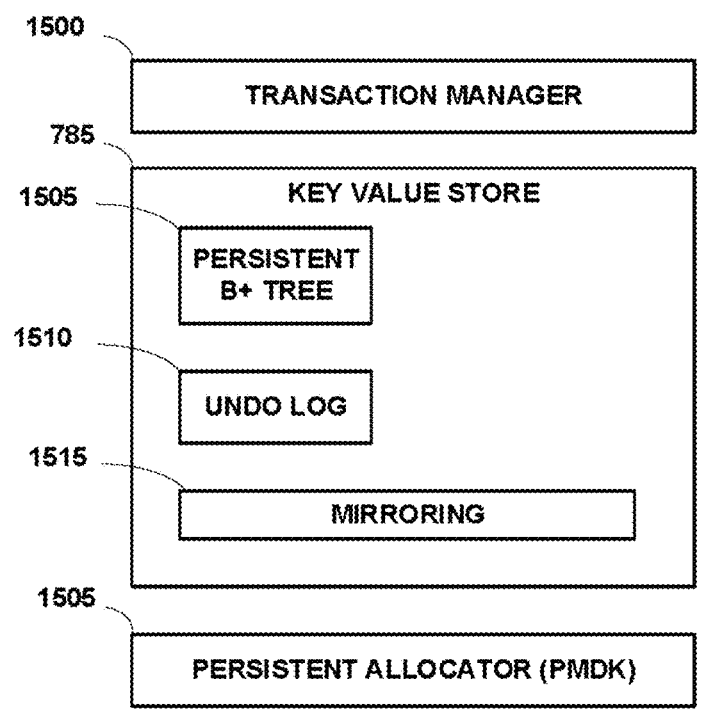
FIG. 15 depicts an example of selected parts of the architecture for the controllers in FIG. 7 that manage transactions on the key-value stores therein.

Thus, the "persistence boundary" is the boundary between the CPU 750 and the memory controller 755 in this example. With respect to consistency, the B+ tree image captured upon sudden power loss should be consistent at all times. In this context, "captured" means the state of the B+ tree recorded in the persistent B+ tree 1505 and undo log 1510, both of which are shown in FIG. 15 and discussed further below. Also in this context, the B+ tree is "consistent" when there are no unexecuted transactions. That is, all pending transactions interrupted by failure are either completed or undone. With respect to performance, all get and put operations on the B+ tree should complete with low latency. And, with respect to reliability, the B+ tree should be mirrored on the passive controller to prevent a single point of failure.

The goals of durability and consistency can be met using processor commands known as "store barriers". Store barriers control the timing of certain operations within the processor and can be used to control the ordering of execution for commands in processor architectures using out-of-order execution. Examples of such store barriers in the x86 architecture employed by the example of FIG. 7 include CLFLUSH, or CLFLUSHOPT+fence, or CLWS+fence, or MOVNTDQ (non-temporal store)+fence. Architectures other than the x86 architecture may use different store barriers to the same effect in implementing the example disclosed herein.

Figure 8:
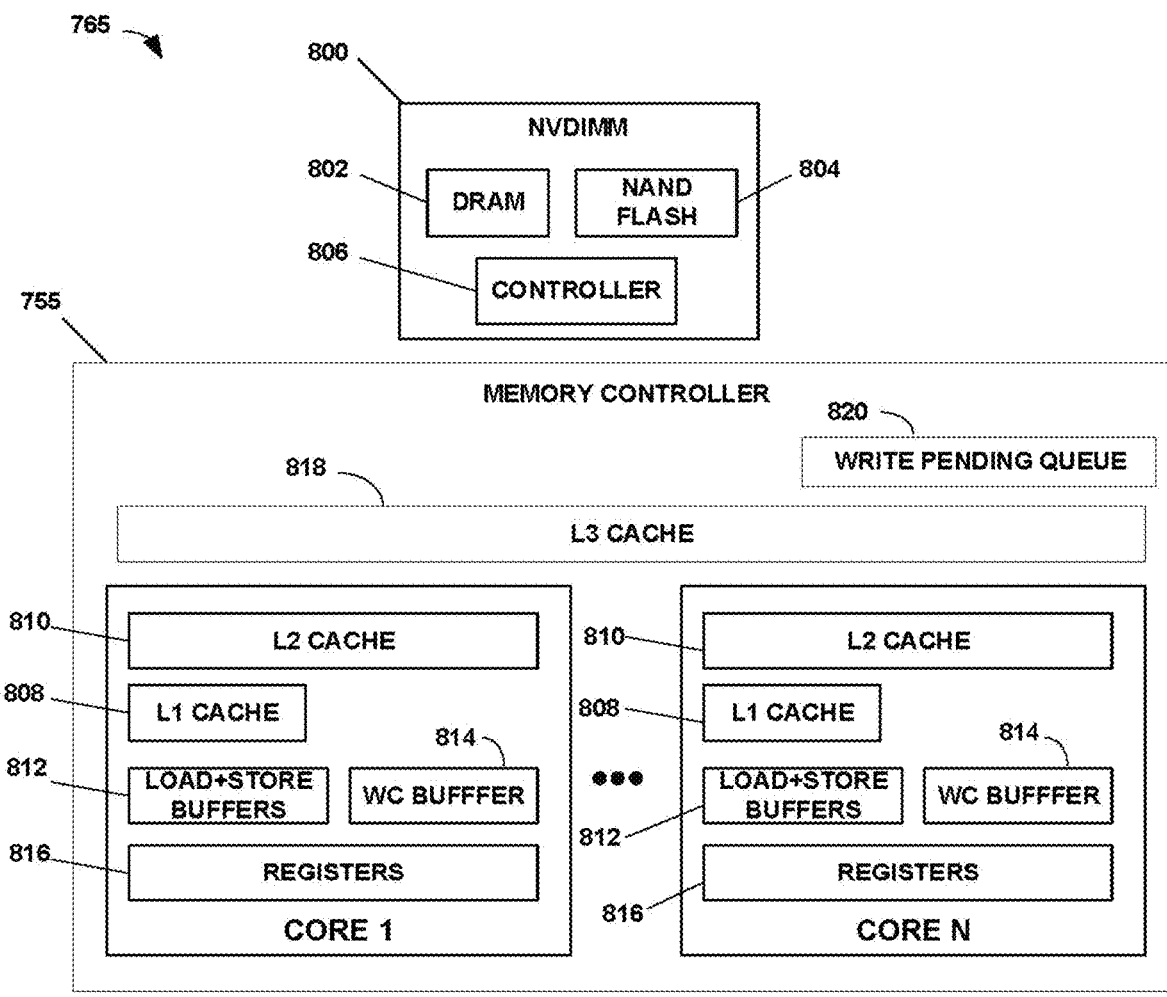
FIG. 8 illustrates the operation of the architecture of FIG. 7 according to one example.

Certain elements of the example in FIG. 7 are shown in FIG. 8 in greater detail. The memory controller 755 forms a part of the persistent memory 765 along with the actual NVDIMM 800. The NVDIMM 800 includes the dynamic random access memory ("DRAM") devices 802, NAND flash memory 804, and a controller 806. The memory controller 755 includes multiple processor cores CORE 1-CORE N. Each core CORE 1-CORE N includes Level 1 and Level 2 caches 808, 810 (referred to as L1, L2 caches), load and store buffers 812, write combining ("WC") buffers 814, and a plurality of registers 816. In addition to the cores CORE 1-CORE N, the memory controller 755 includes a level 3 (or, "L3") cache 818 and a write pending queue 820.

Together, the memory controller 755 and the NVDIMM 800 form an asynchronous DRAM refresh ("ADR") domain. The ADR domain allows the power supply (not shown) to signal to the memory controller 755 that a system power loss, for example, has occurred. Upon receiving this signal, all data within the ADR domain is persisted to the NVDIMM 800 using residual power from a super capacitor (not shown). There ordinarily are no ordering guarantees for reads/write to write-back mapped memory regions. The L1, L2, and L3 caches can be flushed in any order. For memory ordering, reads can go ahead of buffered writes. Accordingly, power-fail consistency enforces ordering via the store barrier instructions such as CLFLUSH, or CLFLUSHOPT+ fence, or CLWS+fence, or MOVNTDQ (non-temporal store)+fence.

With regards to low latency, there is a dilemma when implementing the persistent B+ tree node layout. On one hand, key-value pairs being sorted within a node enable faster lookups because the lookup does not have to perform an expensive linear search through the key-value pairs. On the other hand, allowing key-value pairs to be unsorted enables faster insertions within a node by, among other things, reducing CPU cache line flushes. Re-ordering sorted key-value pairs takes time and cache line flushes are used to maintain consistency on recovery where key-value pairs are re-ordered.

Figure 9:
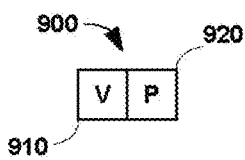
FIG. 9 illustrates one example of a dual pointer in the example of FIG. 7.

The use of the dual pointers 900, one of which is shown in FIG. 9, leverages the duality of nodes 770, 780 in the key-value store 785 and the cache 790, as discussed below. The dual pointers 900 are similar in structure and operation to the dual pointers 200 in FIG. 2 discussed above. The dual pointers 900 are the values 776 of the key-value pairs 775 in the cached nodes 770 as described above relative to the dual pointers 200, shown in FIG. 2, of the key-value pairs 158 of the cached nodes 150 in FIG. 1. Also as discussed above, the cached nodes 770 in the cache 790 are cached from the persistent nodes 780 in the key-value store 785.

Thus, at least some B+ tree nodes (i.e., the persistent nodes 780) may have two logical copies where one is a partial copy of the other as described above (i.e., containing the same set of key-value pairs but having different key-value pair orderings, and/or different physical representations in bits, etc.). One copy in the persistent memory 765 (i.e., the persistent nodes 780) that contains unsorted key-value pairs for fast insertions to which the persistent pointers 920 point and one in the volatile memory 760 (i.e., the cached nodes 770) that contain sorted key-value pairs as well as non-persistent data such as locks to which the volatile pointers 910 point.

This duality of B+ tree nodes brings the advantages of both contexts: fast lookups using cached nodes 770 with sorted key-value pairs 778 in volatile memory 760 and reduced cache line flushes with persistent nodes 780 having unsorted key-value pairs in the persistent memory 765. All traversals from root to leaf node can be done using cached nodes 770 in the cache 790 of the volatile memory 760. Changes will be written to both the volatile memory 760 and the persistent memory 765—i.e., to both copies of a node—when a node is modified. (Note that because of the write operation, the persistent node 780 will be cached as a cached node 770 as described above if it has not already been cached.)

Figure 10:
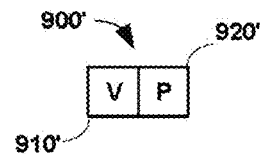
FIG. 10 illustrates one example of a second dual pointer in the example of FIG. 7.

More particularly, and referring to FIG. 7 and FIG. 9 collectively, each cached node 770 includes a plurality of sorted key-value pairs 775. Each key-value pair 775 includes a key 776 and a value 777. In the internal nodes, the values 777 are dual pointers 900 in the manner described above for FIG. 1 and FIG. 4. Each dual pointer 900 includes two parts: a volatile pointer ("vptr") 910 and a persistent pointer ("pptr") 920. The volatile pointer 910 points to a child cached node 770 in the cache 790 of the volatile memory 760. The persistent pointer 920 points to the corresponding child persistent node 780 in the key-value store 785 in the persistent memory 765. Because the cache 790 is mirrored as the cache 790' of the passive controller 705', the values 777' of the key-value pairs 775' in the internal cached nodes 770' are mirrored dual pointers 900', shown in FIG. 10, each including a volatile pointer 910' and a persistent pointer 920'.

Figure 11:
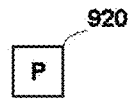
FIG. 11 illustrates one example of a persistent pointer in the example of FIG. 7.
Figure 12:
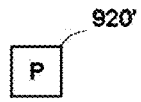
FIG. 12 illustrates one example of a second persistent pointer in the example of FIG. 7.

The unsorted key-value pairs 786 of the persistent nodes 780 in the key-value store 785 of the persistent memory 765 include unsorted keys 782 and their associated values 784. For each internal persistent node 780, the associated value 784 is a persistent pointer 920, shown in FIG. 11, to a child persistent node 780 in the manner described above for FIG. 1 and FIG. 4. Because the key-value store 785 is mirrored as the key-value store 785' of the passive controller 705', the associated values 784 are mirrored for internal persistent nodes 780' as mirrored persistent pointers 920' as shown in FIG. 12.

Figure 13:
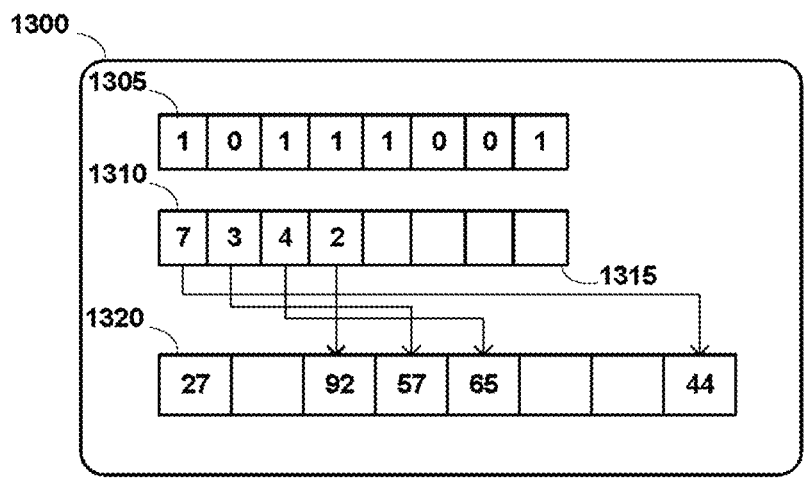
FIG. 13-FIG. 14 illustrate an example of the node structure for the B+ tree in the persistent memory of the example in FIG. 7.
Figure 14:
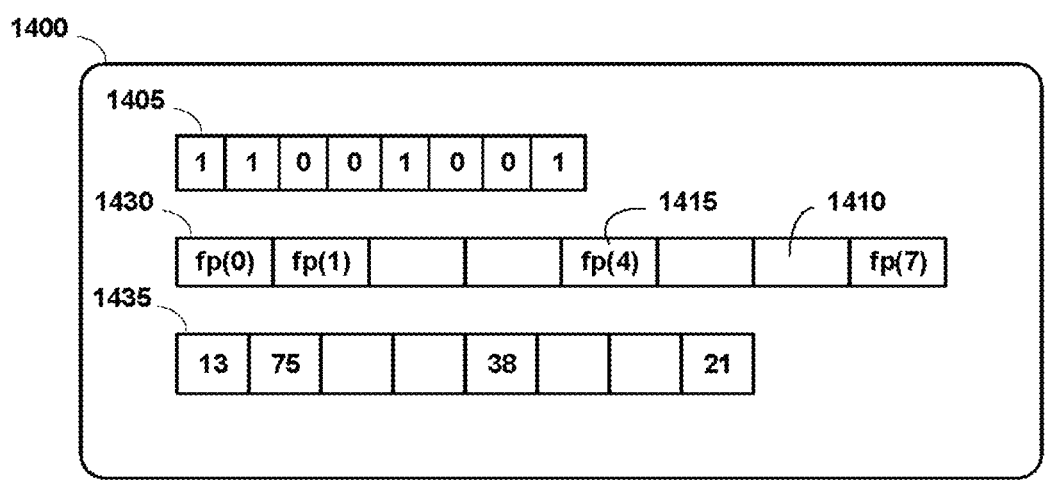

FIG. 13 and FIG. 14 illustrate the node structures for the B+ tree key-value store 785. FIG. 13 illustrates the structure for a representative internal node 1300 and FIG. 14 illustrates the structure for a representative leaf node 1400. Each of the persistent nodes 780 will be either an internal node, as described below in relation to internal node 1300, or a leaf node, as described below in relation to leaf node 1400, depending on their location in the tree as described above. Each persistent node 780 therefore will have a structure such as the internal node 1300 or the leaf node 1400.

The internal node 1300 includes a bitmap 1305 recording availability of slots 1315 within the unsorted node. The internal node 1300 includes a slot array 1310 of slots 1315 that writes an index to unsorted entries in the key-value array 1320 to speed up a binary search. The leaf node 1400 includes a bitmap 1405 recording availability of slots 1410 in an array 1430 of fingerprints 1415, which are small 1-byte hashes, as hints to speed up a linear search of the unsorted key-value array 1435. The nodes 1300, 1400 also include a key-value array 1320, 1435, respectively.

To speed up insertions into the unsorted key-value pairs 775 of the persistent nodes 780 shown in FIG. 7, the bitmaps 1305, 1405 shown in FIG. 13 and FIG. 14, are maintained in the key-value store 785 for each node 770. The bitmap 1305 tracks availability of "slots" 1315 within the node 770 for inserting new key-value pairs 1430. For concurrency control, the cached node 770 maintains an 8-byte versioned lock (not shown). All lookup operations use version validations to resolve read-write conflicts. Insert operations acquire locks on one or more nodes (as described below) to prevent write-write conflicts (i.e., overwriting uncommitted data in interleaved execution of transactions).

Referring now to FIG. 7, the volatile memory 760 serves as a write-through cache to the update buffer in the persistent memory. This means that no operation is considered complete until a write modifying a cached node 770 is also performed on the corresponding persistent node 780. That is, an update to the cached node 770 is also made to the corresponding persistent node 780 before the operation is reported as completed.

Since the volatile memory 760 serves as a write-through cache for the update buffer that is in the persistent memory 765 rather than a shadow copy, there are four states for the dual pointer 900 shown in FIG. 9. Each state is denoted by a tuple {vptr, pptr}. The first state is {NULL, NULL}, which is a NULL dual pointer. The second state is {NULL, p}, a dual pointer containing only a persistent pointer. When a dual pointer is initially read to volatile memory, it will be in this state. The third state is {v, p}, a dual pointer with both a valid volatile pointer and a valid persistent pointer (all valid nodes that have a volatile copy cached in volatile memory will use a pointer in this state). And the fourth state is {v, NULL}, an invalid state because volatile memory is a write-through cache. That is, when data is written to the persistent memory 765, it is also written into the volatile memory 760 at the same time as described herein. So, there will be no cached node 770 which has no corresponding persistent node 780.

The illustrated example implements a series of tree operations in furtherance of the disclosed functionality. Of current interest here are the Get( ), Put( ), and Del( ) functions. Note that these are implementation specific and may vary in other examples. Each of these three functions will be described at a high level. However, those skilled in the art having the benefit of this disclosure will be able to readily implement them or functions similar to them.

The Get( ), Put( ), and Del( ) functions are used in recovery in the same manner they are used in other operations associated with the volatile memory 760 and the persistent memory 785. They are a part of the standard x86 architecture and operate the same as in conventional systems employing the x86 architecture except as modified somewhat for use in the present context of the example examples as will now be described.

The Get( ) function traverses down the B+ tree from the root to leaf using the search key in the key-value array 1320 of each internal persistent node 1300. Note that the internal persistent nodes 1300 at this point are internal nodes of the B+ tree. While traversing down the B+ tree, an internal cached node 1300 is cached for each persistent node lacking a volatile copy in volatile memory 760. Upon reaching the leaf node, the key-value pain 435 is located (using the hash, or fingerprint, 1415). Finally, the Get( ) function validates the version of the leaf node 1400 against the version encountered while first visiting the node.

The Put( ) function traverses down to the leaf node 1400 and locks the leaf node 1400. It then inserts the key-value pair in the array 1435. For crash consistency, the key-value pair is inserted before the bitmap 1405 for the node is updated. In case a node split occurs, it drops the leaf node lock and re-acquires all necessary node locks (in a predefined order) and split nodes from bottom to top. For atomicity, the split operation uses an undo log that records the key-value movements for each node involved in the split.

The Del( ) function reduces write amplification during node merges by relaxing the height balance considerations for the B+ tree. This assumption is made because in this particular example random deletes from the update buffer are rare—once a tree is fully populated, it is typically deleted in its entirety after its contents are flushed to disk. The assumption allows the persistent memory to avoid merge operations in the tree at the cost of occasional imbalance.

More generally, and referring to FIG. 15, transactions such as those performed by the Get( ), Put( ), and Del( ) functions discussed above are conducted by a transaction manager 1500 in conjunction with the persistent allocator ("PMDK") 1505. The key-value store 785 includes not only the persistent B+ Tree 1505 but also an undo log 1510, and replication instructions 1515 used for mirroring. The undo log 1510 tracks in-flight transactions that have not yet been completed. Recovery time in this particular example is bounded by limiting the number of concurrent outstanding transactions.

The transaction manager 1500 and the persistent allocator 1505 are actually a part of the CPU 750 of the active controller 705 and typically are implemented in a combination of hardware and software. The transaction layer is based on Optimistic Concurrency Control ("OCC") on top of the key-value store 785. This facilitates version validation and locking for stronger isolation and per-CPU undo logging for atomic multi-put operations.

In operation, the active controller 705 receives and transmits data to and from the backend storage 710 via the persistent memory 765 and the volatile memory 760. The key-value store 785 (i.e., the persistent B+ tree in this example) is established and maintained as well as the cache 790 as described above using the Get( ), Put( ), and Del( ) tree functions. Non-modifying operations, such as traversals and lookups, start from cached internal nodes. Modifying operations, such as inserts and deletes, apply changes to both volatile and persistent nodes.

During normal operation, to retrieve information, the Get ( ) function starts at the root of the tree in the cache, checks for the volatile pointer in the cached root node. If the root node is not found, it is cached from persistent memory as described above. Once cached, then the volatile pointer is checked. A binary search is performed to locate the child node(s) using the same process of checking the cache first and then, if the cached node is missing, retrieving it from the persistent memory, sorting the keys and their assorted values, and caching the node. The process repeats all the way down to the leaf nodes until the information being sought is cached and can be accessed from the cache.

In normal operations, the Put( ) function descends to the leaf node in the same manner as the Get ( ) function described immediately above. The Put( ) function finds an empty slot in the leaf node in persistent memory. This includes performing a search on a bitmap in the leaf node indicating the location of the free slot. The value is then updated by writing to the empty slot, the bitmap is updated. If there is a crash in the middle of the Put( ), since the bitmap is updated last, it can be detected that the Put( ) did not finish. Note that the update is also made to the counterpart cached node in the same manner except that there is no bitmap.

If the node is full, the node is split. Because the split is performed in a persistent data structure, it should be performed atomically using an undo log. A new node structure is instantiated and a portion of the key-value pairs in the original, full node are copied over. The pointers are updated and the update is rolled up the tree. If the operation is interrupted and a recovery instituted, the undo log is consulted. Depending on the state of the pointer update and the roll up, the split is either "undone" or completed for the recovery. Note, again, that the split operation is also performed in the cache but that it is not tracked because the cache does not persist and is rebuilt during recovery.

These actions are all a part of normal operations and indicate how normal operations can impact recovery. This is because, although the cache does not have to be rebuilt, the persistent memory is recovered. As a part of recovering persistent memory, the Put( ) function tracks operations in the undo log, such as the split operation. The undo log also tracks operations where users of the key-value store insert or update multiple key-value pairs during a single transaction. The recovery goes through the undo log to either complete or roll back any interrupted operations in order to recover the persistent memory.

As discussed above, recovery occurs upon a number of events such as failover or loss of system power. The recovery process starts by scanning the undo log for in-flight operations and then rolling back the B+ tree in the persistent memory 765' of the passive controller 705' to a consistent state. After a process restart or controller failover, the dual pointer for any given node is in the (NULL, p) state until the node's first access after recovery. This state arises because the cached nodes 770' do not persist, and so are NULL, while the persistent nodes 780' persist, and so "p" still exists.

There is no need to initialize non-persistent data during recovery because the cache 790' is rebuilt on first access in the key-value store 785' during operations once recovery is completed. In the event that a lookup does not find the cached node 770 in the volatile memory 760, the lookup visits the persistent node 780 in the persistent memory 765 where the key-value pairs 786 are unsorted. (A "lookup" is a part of operations such as Get( ), Put( ), and Del( ) functions mentioned above to "lookup", or locate a value in the B+ tree.) To avoid an expensive linear scan, the persistent node 780 maintains per-key hashes (or fingerprints) 1415 within the node structure as shown in FIG. 14. These hash values are chosen to be small (1-byte) so that the entire node's hashes can fit within one CPU cache line. By scanning the hashes 1430, one can quickly lookup a key within the node.

To ensure high reliability for the update buffer, the B+ tree updates to the key-value store 785 are also replicated over PCIe NTB 768 to the key-value store 785' of the passive controller 705'. In this particular example, the replication is done at a logical level, i.e. the physical layout of the B+ tree on the persistent memory is different on both controllers. This is achieved by running a daemon (not shown) on the passive controller 705' which receives messages over the NTB 768 regarding the logical updates to the B+ tree. These are applied to the tree on the standby, using undo logging to ensure consistency on both sides.

In some conventional practice, recovery time may worsen as NVDIMM size increases, while write amplification decreases. Recovery time may worsen because recovery may involve a full scan of persistent memory (e.g., NVDIMMs) to rebuild shadow copies of the persistent memory data in volatile memory (e.g., DRAM). Write performance, on the other hand, may improve because large persistent memory may lower write amplification for on-disk indexes. This tradeoff between recovery time and write performance is undesirable.

The example illustrated in FIG. 7 uses dual controllers 705, 705' in active-passive configuration for high availability. One consideration here is the process of recovery after "failover" described above. In some conventional practice, controller failover times may be in the range of 20 to 30 seconds, and may be dominated by the processing involved to recover the entire contents of persistent memory (NVDIMM) into the volatile memory (DRAM) (e.g., where persistent memory is used as an update buffer to stage data & metadata before flushing to backend storage). While a larger persistent memory may negatively impact the failover time, it is beneficial to the performance of the system due to lower write amplification for metadata.

To mitigate this tradeoff between failover time and performance, examples described herein may manage the update buffer in the persistent memory 765 as a persistent key-value store 785 that may use less processing to recover into volatile memory 760. The key-value store 785 is based on a B+ tree structure on the persistent memory 765. Advantages of the B+ tree design include fast recovery in addition to efficient performance. Examples described herein may make the failover time independent of the persistent memory size, and also bring significant improvements to the write performance on the backend storage 710.

Figure 16:
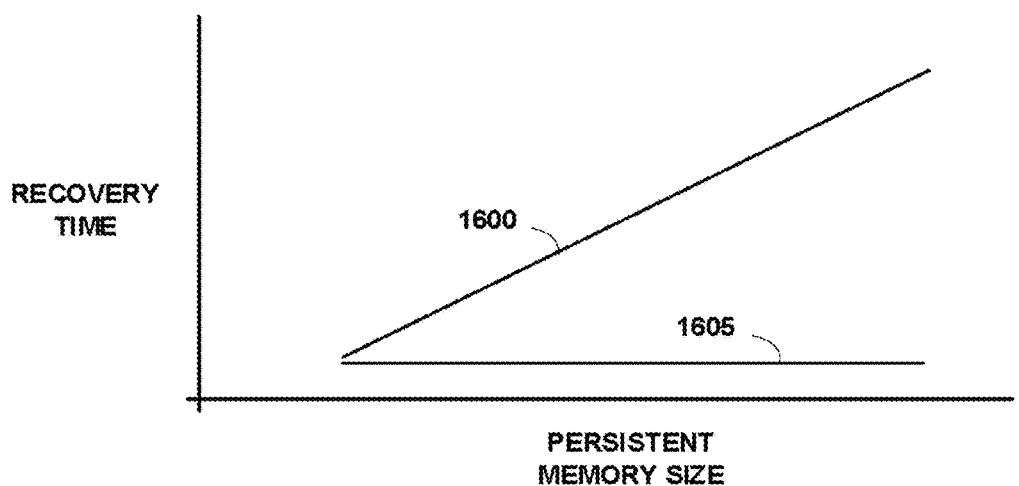
FIG. 16 illustrates an example of the recovery time versus persistent memory size for both conventional practice and for examples disclosed herein to illustrate an improvement in recovery time that may be provided by examples described herein over conventional practice.

FIG. 16 shows an example of the potential improvement in recovery time for this technique relative to other examples. FIG. 16 more particularly graphs the recovery time versus persistent memory size for both conventional practice 1600 and for the presently disclosed technique 1605. As discussed above, in conventional practice, the volatile memory typically includes a full shadow copy of the contents of the persistent memory that is rebuilt on recovery. In the techniques disclosed herein, because the cache is rebuilt "on demand", recovery can proceed without having to wait for the rebuild of the entire shadow copy. Note that the improvement scales directly with the increase in persistent memory size. Similar improvements for write amplification can also be experienced.

Figure 17:
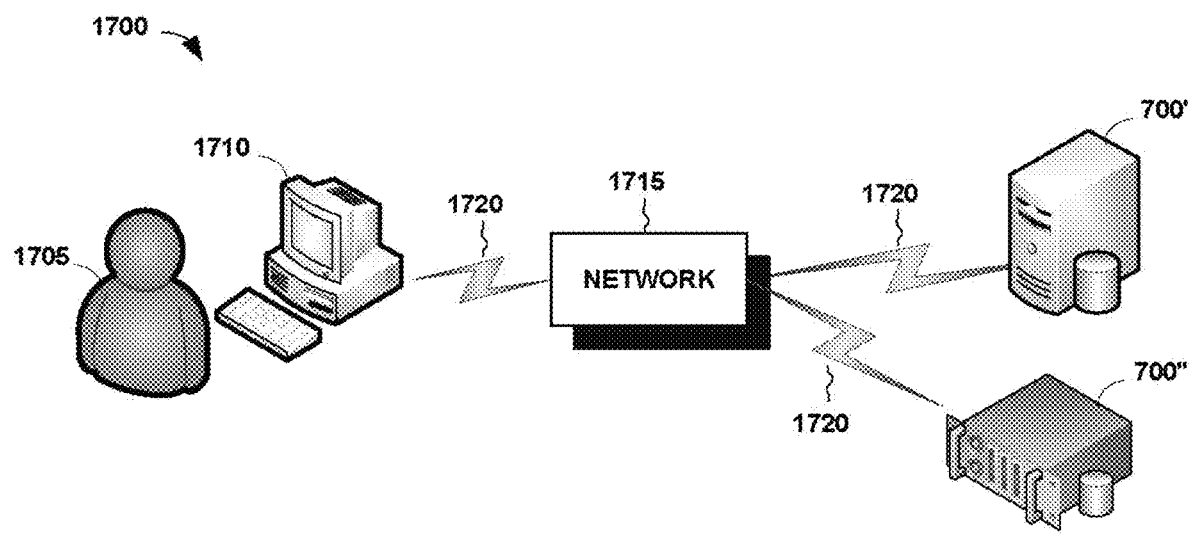
FIG. 17 conceptually illustrates an example computing system in which the device of FIG. 7 might be used in some examples.

FIG. 17 illustrates selected portions of an example computing system 1700 in which the storage system 700 may be employed. In some examples, storage system 700 may be, for example, a storage array comprising one or more controller(s) and a plurality of storage devices. In other examples, the storage system 700 may be, for example, a free standing database server 700' or a rack mounted database server 700". The user 1705 on the computing apparatus 1710 may be interfacing with an application reading and writing data residing on one or both of the servers 700', 700" over the network 1715 and communications links 1720. The implementation of the network 1715 defines the fabric 715 shown in FIG. 7. However, as noted above, the subject matter claimed below is not limited to use in storage systems such as the servers 700', 700". In alternative examples, the technique described herein may be employed on other types of computing apparatuses, such as the computing apparatus 1710.

Some portions of the detailed descriptions herein are presented in terms of a software implemented process involving symbolic representations of operations on data bits within a memory in a computing system or a computing apparatus. These descriptions and representations are the means used by those in the art to most effectively convey the substance of their work to others skilled in the art. The process and operation involve physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as data, bits, values, elements, symbols, characters, terms, numbers, or the like.

All of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, machine, or system that manipulates and transforms data represented as physical (electronic, magnetic, or optical) quantities within some electronic device's storage into other data similarly represented as physical quantities within the storage, or in transmission or display devices. Examples of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the examples described herein are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The subject matter claimed below is not limited by these aspects of any given implementation.

This concludes the detailed description. The particular examples disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular examples disclosed above may be altered or modified and all such variations are considered within the scope and spirit of the appended claims. Accordingly, the protection sought herein is as set forth in the claims below.

What is claimed:

1. A method for use in a computing apparatus, the method comprising:
   storing data in a key-value store residing in persistent memory, the key-value store structured as a tree including a plurality of persistent internal nodes including key-value pairs that are unsorted in the persistent internal nodes;
   building a cache of cached internal nodes in volatile memory, the cached internal nodes cached from selected ones of the persistent internal nodes present in the persistent memory, respectively, the cached internal nodes including sorted key-value pairs, and each cached internal node comprising a dual pointer including a volatile pointer to a node in the volatile memory that is a child node of the cached internal node and a persistent pointer to a node in the persistent memory that is a child node of the persistent internal node from which the cached internal node is cached; and
   using the cache as a write-through cache for the persistent internal nodes in the persistent memory.

2. The method of claim 1, further comprising:
   performing a lookup operation to access a desired key-value pair using the sorted keys and volatile pointers of the cached internal nodes; and
   performing an insertion operation using the unsorted keys and persistent pointers of the persistent internal nodes, wherein the selected persistent internal nodes include the persistent pointers of the cached nodes.

3. The method of claim 1, wherein:
   each of the cached internal nodes is a partial copy of one of the selected persistent internal nodes, wherein, for the key-value pairs of each of the cached internal nodes:
      the keys are respective copies of the keys of the key-values pairs of the selected persistent internal nodes from which the cached internal nodes are cached;
      the values include persistent pointers stored as the values of the key-values pairs of the selected persistent internal nodes from which the cached internal nodes are cached; and
   for the cached internal nodes, the values include the volatile pointers, wherein the volatile pointers are not included in the selected persistent internal nodes from which the cached internal nodes are cached.

4. The method of claim 1, further comprising:
   selecting, to be cached as one of the cached internal nodes, each of the persistent internal nodes the tree and that is accessed on a path from a root node of the tree to an accessed key since a last recovery of the computing apparatus.

5. The method of claim 1, further comprising:
   inserting a given key-value pair in the key-value store, comprising:
      inserting the given key-value pair into one of the persistent internal nodes with unsorted key-value pairs; and
      inserting the given key-value pair into one of the cached internal nodes with sorted key-value pairs.

6. The method of claim 1, further comprising:
   rebuilding the cache on demand in the event of recovery, the rebuilding comprising:
      resuming operations after a restart of the computing apparatus, beginning with no cached internal nodes cached in the volatile memory; and
      as accesses are made, attempting each access first via any cached internal nodes present in the volatile memory at the time of the access and second via the persistent internal nodes in the persistent memory when the access via cached internal nodes in the volatile memory fails.

7. The method of claim 1, further comprising:
   mirroring the persistent internal nodes from a first controller to a second controller, the first controller comprising the volatile memory and the persistent memory and the second controller comprising another volatile memory and another persistent memory.

8. The method of claim 7, further comprising:
with the second controller, rebuilding the cache on demand in the event of a failover from the first controller to the second controller, the rebuilding comprising:
with the second controller, resuming operations of the first controller, beginning with no cached internal nodes cached in the another volatile memory of the second controller; and
as accesses are made, attempting each access first via any cached internal nodes present in the another volatile memory at the time of the access and second via copies of the persistent internal nodes in the another persistent memory of the second controller when the access via cached internal nodes in the another volatile memory fails.

9. A computing apparatus, comprising:
a processor;
volatile memory;
persistent memory; and
a non-transitory machine-readable storage medium storing instructions executable by the processor to:
store data in a key-value store residing in the persistent memory, the key-value store structured as a tree including a plurality of persistent internal nodes including key-value pairs that are unsorted in the persistent nodes;
build a cache of cached internal nodes in the volatile memory, the cached internal nodes cached from selected ones of the persistent internal nodes present in the persistent memory, the cached internal nodes including sorted key-value pairs, and each cached internal node comprising a dual pointer including a volatile pointer to a node in the volatile memory that is a child node of the cached internal node and a persistent pointer to a node in the persistent memory that is a child node of the persistent internal node form which the cached internal node is cached; and
use the cache as a write-through cache for the persistent internal nodes in the persistent memory.

10. The apparatus of claim 9, wherein the instructions are executable to:
perform a lookup operation to access a desired key-value pair using the sorted keys and volatile pointers of the cached internal nodes; and
perform an insertion operation using the unsorted keys and persistent pointers of the persistent internal nodes, wherein the selected persistent internal nodes include the persistent pointers of the cached nodes.

11. The apparatus of claim 9, wherein:
each of the cached internal nodes is a partial copy of one of the selected persistent internal nodes, wherein, for the key-value pairs of each of the cached internal nodes:
the keys are respective copies of the keys of the key-values pairs of the selected persistent internal nodes from which the cached internal nodes are cached;
the values include persistent pointers stored as the values of the key-values pairs of the selected persistent internal nodes from which the cached internal nodes are cached; and
for the cached internal nodes, the values include the volatile pointers, wherein the volatile pointers are not included in the selected persistent internal nodes from which the cached internal nodes are cached.

12. The apparatus of claim 9, wherein the instructions are executable to:
select, to be cached as one of the cached internal nodes, each of the persistent internal nodes the tree and that is accessed on a path from a root node of the tree to an accessed key since a last recovery of the computing apparatus.

13. The apparatus of claim 9, wherein the instructions are executable to:
insert a given key-value pair in the key-value store, comprising:
inserting the given key-value pair into one of the persistent internal nodes with unsorted key-value pairs; and
inserting the given key-value pair into one of the cached internal nodes with sorted key-value pairs.

14. The apparatus of claim 9, wherein the instructions are executable to:
rebuild the cache on demand in the event of recovery, the rebuilding comprising:
resuming operations after a restart of the computing apparatus, beginning with no cached internal nodes cached in the volatile memory; and
as accesses are made, attempting each access first via any cached internal nodes present in the volatile memory at the time of the access and second via the persistent internal nodes in the persistent memory when the access via cached internal nodes in the volatile memory fails.

15. The apparatus of claim 9, further comprising:
a first controller comprising the processor, the volatile memory, and the persistent memory; and
a second controller comprising another processor, another volatile memory, and another persistent memory; and
wherein the instructions are executable by the processor of the first controller to mirror the persistent internal nodes from the first controller to the second controller.

16. The apparatus of claim 15, further comprising:
the second controller to rebuild the cache on demand in the event of a failover from the first controller to the second controller, the rebuilding comprising:
with the second controller, resuming operations of the first controller, beginning with no cached internal nodes cached in the another volatile memory of the second controller; and
as accesses are made, attempting each access first via any cached internal nodes present in the another volatile memory at the time of the access and second via copies of the persistent internal nodes in the another persistent memory of the second controller when the access via cached internal nodes in the another volatile memory fails.

17. A non-transitory machine-readable storage medium storing instructions executable by a processor to:
store data in a key-value store residing in persistent memory, the key-value store structured as a tree including a plurality of persistent internal nodes including key-value pairs that are unsorted in the persistent nodes;
build a cache of cached internal nodes in volatile memory, the cached internal nodes cached from selected ones of the persistent internal nodes present in the persistent memory, the cached internal nodes including sorted key-value pairs, and each cached internal node comprising a dual pointer including a volatile pointer to a node in the volatile memory that is a child node of the cached internal node and a persistent pointer to a node in the persistent memory that is a child node of the persistent internal node form which the cached internal node is cached; and use the cache as a write-through cache for the persistent internal nodes in the persistent memory.

18. The non-transitory machine-readable storage medium of claim 17, wherein the instructions are executable to:

perform a lookup operation to access a desired key-value pair using the sorted keys and volatile pointers of the cached internal nodes; and perform an insertion operation using the unsorted keys and persistent pointers of the persistent internal nodes, wherein the selected persistent internal nodes include the persistent pointers of the cached nodes.

19. The non-transitory machine-readable storage medium of claim 17, wherein the instructions are executable to:

insert a given key-value pair in the key-value store, comprising:

inserting the given key-value pair into one of the persistent internal nodes with unsorted key-value pairs; and inserting the given key-value pair into one of the cached internal nodes with sorted key-value pairs.

20. The non-transitory machine-readable storage medium of claim 17, wherein the instructions are executable to:

rebuild the cache on demand in the event of recovery, the rebuilding comprising:

resuming operations after a restart of the computing apparatus, beginning with no cached internal nodes cached in the volatile memory; and as accesses are made, attempting each access first via any cached internal nodes present in the volatile memory at the time of the access and second via the persistent internal nodes in the persistent memory when the access via cached internal nodes in the volatile memory fails.

* * * * *